(12) United States Patent
Nooren et al.

(10) Patent No.: US 12,250,557 B2
(45) Date of Patent: Mar. 11, 2025

(54) REREGISTRATION DURING NETWORK SLICE FAILURE

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Pieter Nooren, Delft (NL); Wieger IJntema, Rotterdam (NL); Toni Dimitrovski, Boskoop (NL); Jan Willem Martin Kleinrouweler, Pijnacker (NL)

(73) Assignees: Koninklijke KPN N.V., Rotterdam (NL); Nederlandse Organisatie Voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 267 days.

(21) Appl. No.: 17/780,748

(22) PCT Filed: Dec. 15, 2020

(86) PCT No.: PCT/EP2020/086105
§ 371 (c)(1),
(2) Date: May 27, 2022

(87) PCT Pub. No.: WO2021/122516
PCT Pub. Date: Jun. 24, 2021

(65) Prior Publication Data
US 2022/0417758 A1    Dec. 29, 2022

(30) Foreign Application Priority Data

Dec. 16, 2019 (EP) .................................. 19216368

(51) Int. Cl.
*H04W 16/04* (2009.01)
*H04W 48/18* (2009.01)
*H04W 60/06* (2009.01)

(52) U.S. Cl.
CPC .......... *H04W 16/04* (2013.01); *H04W 48/18* (2013.01); *H04W 60/06* (2013.01)

(58) Field of Classification Search
CPC ..... H04W 16/04; H04W 36/14; H04W 60/06; H04W 48/18; H04W 36/22; H04W 48/06;
(Continued)

(56) References Cited

U.S. PATENT DOCUMENTS 9,497,136 B1   11/2016   Ramarao et al.
10,361,843 B1   7/2019   Suthar et al.
(Continued)

FOREIGN PATENT DOCUMENTS

CN   101547150   9/2009
CN   106922002   4/2017
(Continued)

OTHER PUBLICATIONS

Qualcomm Incorporated: "(TP for NR BL CR for TS 38.413): General Fallback", 3GPP Draft; R3-184685 General Fallback, Aug. 11, 2018.
(Continued)

*Primary Examiner* — Kibrom T Hailu
(74) *Attorney, Agent, or Firm* — Hamilton, Brook, Smith & Reynolds, P.C.

(57) ABSTRACT

A control system enables re-registration of user equipment (UE) on an alternative network in the event of a partial failure of a network (VPLMN) for wireless communication. An access and mobility management function (AMF) manages the communication to user equipment (UE) via network slices (1,2,3). A slice priority management function (SPM)
(Continued)

receives data indicative of a change in the network's ability to maintain the instantiated network slices and determines to reduce services via affected network slices. Before said slice reduction, the access and mobility management function is informed and sends a slice reduction message to the user equipment. In the UE an alternate network selection function (ANSF) receives the slice reduction message and selects an alternate network based on the user information (USIM) and the slice reduction information, and triggers registration on the selected alternate network for transferring at least part of the affected services to a network slice of the selected alternate network.

16 Claims, 9 Drawing Sheets

(58) Field of Classification Search
CPC ......... H04L 47/80; H04L 45/28; H04L 47/74; H04L 47/746; H04L 45/22
See application file for complete search history.

(56) References Cited

U.S. PATENT DOCUMENTS

| | | | |
|---|---|---|---|
| 10,440,642 | B2 | 10/2019 | Zait |
| 10,506,489 | B2 | 12/2019 | Vrzic |
| 10,644,955 | B2 | 5/2020 | Zhang et al. |
| 10,986,540 | B2 | 4/2021 | Bor et al. |
| 11,051,210 | B2 | 6/2021 | Sciancalepore et al. |
| 11,470,620 | B2 | 10/2022 | Wieger et al. |
| 11,916,734 | B2 | 2/2024 | D'Acunto et al. |
| 2011/0249685 | A1 | 10/2011 | Liang |
| 2013/0339495 | A1 | 12/2013 | Mower |
| 2016/0352924 | A1 | 12/2016 | Senarath et al. |
| 2016/0353367 | A1 | 12/2016 | Vrzic et al. |
| 2016/0353465 | A1 | 12/2016 | Vrzic et al. |
| 2017/0086118 | A1 | 3/2017 | Vrzic |
| 2017/0208019 | A1 | 7/2017 | Shimojou et al. |
| 2017/0366399 | A1 | 12/2017 | Li et al. |
| 2018/0013680 | A1 | 1/2018 | Bull et al. |
| 2018/0077024 | A1 | 3/2018 | Zhang |
| 2018/0123878 | A1 | 5/2018 | Li et al. |
| 2018/0131578 | A1 | 5/2018 | Cui et al. |
| 2018/0132117 | A1 | 5/2018 | Senarath et al. |
| 2018/0132138 | A1 | 5/2018 | Senarath et al. |
| 2018/0139129 | A1 | 5/2018 | Dowlatkhah et al. |
| 2018/0199279 | A1 | 7/2018 | Baek et al. |
| 2018/0220276 | A1 | 8/2018 | Senarath et al. |
| 2018/0260200 | A1 | 9/2018 | Karagiannis et al. |
| 2018/0316627 | A1 | 11/2018 | Cui et al. |
| 2019/0089780 | A1 | 3/2019 | Yousaf et al. |
| 2019/0109768 | A1 | 4/2019 | Senarath et al. |
| 2019/0174320 | A1 | 6/2019 | Kodaypak et al. |
| 2019/0174322 | A1 | 6/2019 | Deviprasad et al. |
| 2019/0174347 | A1 | 6/2019 | Dowlatkhah et al. |
| 2019/0174449 | A1 | 6/2019 | Shan et al. |
| 2019/0182876 | A1 | 6/2019 | Ying et al. |
| 2019/0342761 | A1* | 11/2019 | Yu ........................ H04W 8/18 |
| 2019/0357129 | A1 | 11/2019 | Park et al. |
| 2019/0357130 | A1 | 11/2019 | Garcia et al. |
| 2020/0044909 | A1 | 2/2020 | Huang et al. |
| 2020/0045548 | A1 | 2/2020 | Dowlatkhah |
| 2020/0053083 | A1* | 2/2020 | Kunz ................. H04L 69/329 |
| 2020/0154292 | A1 | 5/2020 | Bor-Yaliniz et al. |
| 2021/0067421 | A1 | 3/2021 | Kidd et al. |
| 2021/0345357 | A1 | 11/2021 | Ijntema et al. |
| 2021/0392040 | A1 | 12/2021 | Kerboeuf et al. |
| 2022/0158903 | A1 | 5/2022 | D'Acunto et al. |
| 2022/0239568 | A1* | 7/2022 | Celozzi ............... H04L 41/342 |
| 2022/0256439 | A1* | 8/2022 | Casati ................ H04W 60/00 |
| 2022/0338151 | A1* | 10/2022 | Tang .................... H04W 48/18 |
| 2022/0394396 | A1* | 12/2022 | Gallègo ................ A61B 5/296 |
| 2023/0006884 | A1 | 1/2023 | IJntema et al. |
| 2023/0007662 | A1 | 1/2023 | IJntema |
| 2023/0031777 | A1 | 2/2023 | IJntema et al. |
| 2023/0217362 | A1* | 7/2023 | Sharma ................ H04W 24/02 370/329 |

FOREIGN PATENT DOCUMENTS

| | | |
|---|---|---|
| CN | 107087255 A | 8/2017 |
| CN | 107113195 A | 8/2017 |
| CN | 107743100 | 2/2018 |
| CN | 108270823 | 7/2018 |
| CN | 108293004 | 7/2018 |
| CN | 108566659 | 9/2018 |
| CN | 109120426 A | 1/2019 |
| CN | 109391498 A | 2/2019 |
| CN | 109417731 A | 3/2019 |
| EP | 3396997 A1 | 10/2018 |
| WO | 2017/197273 A1 | 11/2017 |
| WO | 2018/000239 A1 | 1/2018 |
| WO | 2018/035431 A1 | 2/2018 |
| WO | 2018/067780 A1 | 4/2018 |
| WO | 2018/089634 A1 | 5/2018 |
| WO | 2018/137499 A1 | 8/2018 |
| WO | 2018/169382 A1 | 9/2018 |
| WO | 2018/196793 A1 | 11/2018 |
| WO | 2018/228674 A1 | 12/2018 |
| WO | 2019/064274 A1 | 4/2019 |
| WO | WO 2019/160390 A1 | 8/2019 |
| WO | 2019/184967 A1 | 10/2019 |
| WO | 2019/206396 A1 | 10/2019 |
| WO | WO 2020/074687 | 4/2020 |
| WO | 2020/193394 A1 | 10/2020 |
| WO | 2021/110894 A1 | 6/2021 |
| WO | 2021/123411 A1 | 6/2021 |

OTHER PUBLICATIONS

China Telecom ct al: "Discussion on network slice priority", 3GPP Draft, S5-185607 Discussion on Network Slice Priority, Aug. 24, 2018.
Written Opinion and International Search Report for PCT Application No. PCT/EP2020/086105, entitled "Reregistration During Network Slice Failure", mailed Feb. 16, 2021.
Qiang, L., et al., "Technology Independent Information Model for Network Slicing; draft-qiang-coms-netslicing-information-model-01," Internet Engineering Task Force, pp. 1-25, Standard working draft, Internet Society, Rue Des Falaises Ch-120, No. 1 (2017).
3GPP TS 22.261 v16.3.0, 3rd Generation Partnership Project; Technical Specification Group Services and System Aspects; Service requirements for the 5G system; Stage 1 (Release 16) (Mar. 2018).
3GPP TR 28.801; Technical Specification Group Services and System Aspects; Telecommunication management; Study on management and orchestration of network slicing for next generation network (Release 15), pp. 1-75: V15.1.0(5SA WG5) (Jan. 4, 2018).
Huawei, "Add use case and requirement for network slice instance priority", 3GPP Draft; S5-175111 PCR 28 530 Add Use Case and Requirement for Network Slice Instance Priority, 3rd Generation Partnership Project (3GPP), Oct. 16, 2017-Oct. 20, 2017: F-069(SA WG5) (Oct. 15, 2017).
3GPP TS 28.530, "Management and orchestration; Concepts, use cases and requirements," 3GPP, Sep. 2018.
3GPP TS 28.533, "Management and orchestration; Architecture framework," 3GPP, Sep. 2018.
3rd Generation Partnership Project (3GPP) TS 23.501 V16.2.0 (Sep. 2019), Technical Specification, 3rd Generation Partnership Project; Technical Specification Group Services and System Aspects; System Architecture for the 5G System (5GS); Stage 2 (Release 16).
3GPP TS 23.502 V16.2.0 (Sep. 2019), Technical Specification, 3rd Generation Partnership Project; Technical Specification Group Services and System Aspects; Procedures for the 5G System (5GS); Stage 2 (Release 16).
3GPP TS 28.531 V16.3.0 (Sep. 2019), Technical Specification, 3rd Generation Partnership Project; Technical Specification Group Services and System Aspects; Management and orchestration; Provisioning (Release 16).

(56) References Cited

OTHER PUBLICATIONS

ETSI GS NFV-MAN 001 VI .1.1 (Dec. 2014), Network Functions Virtualisation (NFV); Management and Orchestration.
Kotulski, Z., et al., Towards constructive approach to end-to-end slice isolation in 5G networks, EURASIP Journal on Information Security, (2018) 2018:2, 23 pages.
Ren, C., et al., Network Slicing: Building Customizable 5G Network, ZTE Technology Journal, Feb. 2018, vol. 24(1) 5 pages. DOI: 10.3969/j.issn.1009-6868.2018.01.006.
Silver D.S., et al., An Invariant for Open Virtual Strings, Journal of Knot Theory and Its Ramifications, Oct. 2004, 10 pages.
Wang, R., et al., Survey of 5G network slicing, Journal of Nanjing University of Posts and Telecommunications (Natural Science Edition, vol. 38(5), Oct. 2018, 9 pages.
ETSI, "GS NFV-MAN 001—Network Functions Virtualisation (NFV); Management and Orchestration," Dec. 2012.
3GPP TR 29.890 V1.2.0 Technical Specification Group Core Network and Terminals; Study on CT WG3 Aspects of 5G System—Phase 1; Stage 3 (Release 15) (Dec. 2017).
Wang, Q., et al., "Architecture and Key technologies of 5G Transport Network Slicing," ZTE Technology Journal, 24(1):58-61 (Feb. 2018).

\* cited by examiner

REREGISTRATION DURING NETWORK SLICE FAILURE

This application is the U.S. National Stage of International Application No. PCT/EP2020/086105, filed Dec. 15, 2020, which designates the U.S., published in English, and claims priority under 35 U.S.C. § 119 or 365 (c) to European Application No. 19216368.1, filed Dec. 16, 2019. The entire teachings of the above applications are incorporated herein by reference.

FIELD OF THE INVENTION

The invention relates to a network for wireless communication to user equipment, the network configured to enable instantiation of network slices which represent virtual networks. The invention further relates to a slice control system for the network, to user equipment arranged for wireless communication to at least one network via one or more network slices, and computer-implemented methods for providing such functions in a network or in a user equipment (UE). The invention may be implemented in a network node or a distributed system of network nodes configured to establish a slice control system in the network.

A network slice may provide communication to the UE but it may also provide (network-based) storage and processing functions for the UE. If so, a (partial) failure in the network may cause a lack of resources for connectivity but also for storage and processing. In this document a network may be a communication network that also provides further functions like storage and processing, where communication and further functions are together called services provided by the network. A partial failure of the network will affect the services provided to the UE.

BACKGROUND ART

Next generation network architectures, such as 5G, may separate network functions from the underlying hardware resources, being in the case of a telecommunication network the network nodes of the network. For that purpose, so-called Network Virtualization (NV) techniques may be used, and in particular Network Function Virtualization (NFV) techniques which provide network functions that are instantiable in software using the hardware of one or more of the network nodes.

Such next generation network architectures may further define virtual data planes which separate data traffic in the network. Such virtual data planes, which may be established by Software-Defined Network (SDN) but also by other techniques, may include a control plane to enable transmission of control data in the network, and a user plane to enable transmission of user data to and/or from User Equipment (UE) connected to the network. The user plane may also be referred to as 'data plane'.

A design target of such and similar next generation network architectures is to provide networks which may be 'tailored' to the requirements of the applications which use the network. Such tailoring may be obtained by instantiation of different network slices which represent virtual networks with different feature sets, e.g., providing different network functions and/or having different network characteristics.

A specific example is 5G network slicing, which allows for the creation of virtual network slices on top of the physical network fabric, with the network slices being tailorable towards requirements of specific applications and application categories. For example, the tailoring may be in terms of Quality of Service (QoS) (e.g., bandwidth, delay, jitter, etc.), network topology (e.g., Local Break Out) and/or in specific functions (e.g., local processing: caching, transcoding, synchronization, etc.).

Network slices may be managed by a network operator using network functions which are accessible to the network operator. The ability for end users to roam with their mobile devices (UEs, User Entities) in other networks (VPLMNs, Visited Public Land Mobile Networks) than their home network (HPLMN, Home PLMN) is one of the key attractions of mobile services. Based on the interoperability between mobile networks, customers can use their phones all over the world for voice and data services.

For example, in the case of video streaming, specific functions in a network slice may include a local streaming server (to minimize latency and possibly increase bandwidth), a transcoder (to re-encode a video stream in a format suitable for the UE), an MPEG DANE (for QoS management), an ICE/STUN server (for NAT traversal), a stream synchronizer (e.g., a device that supports the UE in the synchronization of multiple audiovisual streams, e.g., for a videoconferencing application), and more. This tailoring of feature sets is expected to enable new services, e.g., where ultra-low latency is required, such as Virtual Reality (VR) and Augmented Reality (AR), and improve the performance of existing services, e.g., video streaming in a highly mobile environment. Another example, in the case of automated driving, may use local processing and low-latency connectivity to guarantee the timely collection and analysis of sensor data from cars and roadside units, and timely distribution of critical information back to cars.

Compared to earlier mobile network generations, network virtualization techniques have a much more prominent role in 5G. An important goal in the global mobile operator and vendor community is to use virtualization techniques to create separate and isolated virtual network slices, with properties tailored to the needs of the end users and services that such slices carry, as described above. Following the earlier success of international roaming for voice and data services, it is expected that in 5G, roaming for services based on network slices will be a requirement. For example, in so-called federated slicing architectures, slice-aware roaming is needed to extend the functions based on network slices that users enjoy in one network into other networks.

In the 5G System Architecture in 3GPP TS 23.501 [1], several roaming scenarios are described. As network slicing is typically aimed at services that require a higher quality than 'best effort' connectivity can bring, the handling of network failures is important in roaming, in the same way as it is important in network slicing in non-roaming situations.

An earlier patent application PCT/EP2019/077560, called Dynamic Slice Priority Handling, provides a method to handle the priorities of different virtual network slices that are provided on a physical network in case of lack of network resources, for example in case of a partial network failure. This improves the ability for communication service providers to provide their end users an uninterrupted and high-quality service experience by reducing the number of network slice de-instantiations. The method in the earlier application uses the virtual resources within the network to resolve lack of resources that affect some of its slices. So, the earlier application is limited to measures in a single mobile operator domain.

In the current 3GPP architecture, network slice management, session management for the set-up of connections (PDU sessions) and the registration of UEs on alternative networks during roaming are three separate topics. The availability of resources in slices for use in applications or services is dealt with only at the rather detailed level of individual connections (PDU sessions) as a part of session management, for example during the set-up of the connections. In a roaming situation, a PDU session setup request from a UE may thus rejected because of lack of resources in a slice. It is however not possible to distinguish between a lack of resources caused by reaching the limits of the slice for the communication service provider involved and a lack of resources caused by a network failure. Furthermore, the lack of resources is only dealt with at the level of individual PDU sessions, resulting in independent rejections of PDU session setup requests in case of a network failure.

REFERENCES

[1] 3rd Generation Partnership Project (3GPP) TS 23.501 V16.2.0 (2019-09), Technical Specification, 3rd Generation Partnership Project; Technical Specification Group Services and System Aspects; System Architecture for the 5G System (5GS); Stage 2 (Release 16)
[2] 3GPP TS 23.502 V16.2.0 (2019-09), Technical Specification, 3rd Generation Partnership Project; Technical Specification Group Services and System Aspects; Procedures for the 5G System (5GS); Stage 2 (Release 16)

SUMMARY OF THE INVENTION

It may be desirable to enable the reregistration of a UE on an alternative network for solving the above problems in the event of network failures.

The following measures may use information available in the network slice management to detect network failures in a current network that affect one or more network slices and will thus negatively affect the applications and services of roaming UEs.

In accordance with a first aspect of the invention, there is provided a control system for a network for wireless communication to user equipment (UE), wherein the network is configured to enable instantiation of network slices which represent virtual networks; wherein the system comprises a network interface configured to communicate with the network and a processor system configured to provide an access and mobility management function (AMF) for managing the communication to at least one user equipment (UE) via one or more instantiated network slices, and a slice priority management function (SPM) configured to
receive data indicative of a change in the network's ability to maintain the instantiated network slices; and
determine to reduce services via at least one affected network slice in dependence of the received data; and
before said slice reduction, inform the access and mobility management function of said slice reduction;
the access and mobility management function (AMF) configured to, upon being informed of said slice reduction, send a slice reduction message to the user equipment, the message containing slice reduction information on said slice reduction.

In accordance with a further aspect of the invention, a user equipment is provided for cooperating with the control system defined above, wherein the user equipment comprises a communication interface for wireless communication to at least one network via one or more network slices and a processor system configured to maintain user information (USIM), the user information regarding user identity and user communication information; and provide an alternate network selection function (ANSF) configured to:
receive the slice reduction message: and
select an alternate network based on the user information and the slice reduction information; and
trigger registration on the selected alternate network for transferring at least part of the services of the affected network slice to a network slice of the selected alternate network.

In accordance with a further aspect of the invention, there is provided a computer implemented method for a network for wireless communication to user equipment (UE), wherein the network is configured to enable instantiation of network slices which represent virtual networks;
wherein the method comprises providing an access and mobility management function (AMF) for managing the communication to at least one user equipment (UE) via one or more instantiated network slices, and providing a slice priority management function (SPM) configured to
receive data indicative of a change in the network's ability to maintain the instantiated network slices; and
determine to reduce services via at least one affected network slice in dependence of the received data; and
before said slice reduction, inform the access and mobility management function of said slice reduction;
the access and mobility management function (AMF) configured to
upon being informed of said slice reduction, send a slice reduction message to the user equipment, the message containing slice reduction information on said slice reduction.

In accordance with a further aspect of the invention, a home system is provided for a home network for wireless communication to user equipment (UE), wherein the home network is configured to enable instantiation of network slices which represent virtual networks, wherein the home system comprises a network interface configured to communicate with the home network and the control system as defined above, and a processor system configured to provide a home slice priority management function configured to
receive data indicative of said slice reduction from the slice management function; and
use subscription information of the user equipment to generate preference data indicative of preferences or priorities for slices to be scaled down or removed; and
transmit the obtained preference data to the control system to reduce services via at least one affected network slice in dependence of the obtained preference data.

The above processor systems may have one or more processors and further hardware elements that, with respective computer programs and/or dedicated hardware, provide multiple distributed functionalities such as the AMF, SPM and others. The distributed functionalities together form the system that embodies the invention.

The above measures may involve providing or adapting the slice priority management function (SPM) and the access and mobility management function (AMF) in a slice control system, and an alternate network selection function (ANSF) in the mobile user devices, called user equipment (UE). The network may be a 3GPP network as discussed above, in particular a visited public land mobile network (VPLMN) other than the home network (HPLMN, Home PLMN) of the user during roaming of users with their mobile devices (UEs, User Entities). Roaming is, for example, described in TS 23.501 [1].

The SPM obtains data regarding a partial network failure based on said data received indicative of a change in the network's ability to maintain the instantiated network slices.

Based thereon, the SPM determines that services need to be reduced on one or more slices. Before activating said reduction, the SPM informs the access and mobility management function (AMF).

The AMF, upon being informed of said slice reduction, sends a slice reduction message to the user equipment, the message containing slice reduction information on said slice reduction The slice reduction message may be part of a deregistration message that completely ends the connection of the UE to the network. However, in some scenarios such as when the current slice capacity is partly reduced, other slices may remain active, or in make-before-break scenarios, the slice reduction message may be send as a separate message to enable the user equipment to prepare for the imminent reduction or deregistration. So, reduction may be partly or proportional reduction, or complete reduction, i.e. removal of all slices and as a result of all data plane connectivity. However, even ending all slices via a slice reduction message may not necessarily imply that the UE is deregistered from the network, e.g. in the event of a short and predictable interruption of services.

The user communication information generally may describe the status, requirements and authorizations of the user for communication between the user equipment and networks, and it includes information on allowed and preferred visited networks in roaming situations, and may further include information on slices.

The alternate network selection function (ANSF) receives the slice reduction message, so the UE is aware of the cause of the reduction of services. The ANSF now selects an alternate network based on the user information and the slice reduction information. Then, the ANSF triggers registration on the selected alternate network for transferring at least part of the services of the affected network slice to a network slice of the selected alternate network.

Effectively, the above features provide an alternative and faster remedy for network failures that affect the network slices used by roaming UEs. Previously, individual roaming UEs would experience consequences of a failure through rejected PDU session setups and would not have a view on the cause for the rejections and actions that could resolve the unavailability of connectivity. A default action was to keep trying to set up connections until the failure has been resolved. In the current enhanced system, UEs are informed and steered or forced to move to alternative networks so that they suffer less from the failure and provide a better quality and experience to their users.

The enhanced system further provides a more efficient way for VPLMNs to address network failures. Previously, a VPLMN might be flooded with PDU session setup requests by roaming UEs that experience consequences of a network failure. The enhanced system provides a single action that will free up resources and put an end to the PDU session setups for all involved roaming UEs, preventing the spread of problems due to a partial failure to other UEs, applications or slices that are not directly affected by the failure.

Advantageously, information available in the network slice management is used to detect network failures that affect one or more network slices and will thus negatively affect the applications and services of roaming UEs. Based on this information, the SPM in the network slice management can decide to scale down or remove a slice that serves UEs, e.g. during roaming in a VPLMN. Before or during the actual removal, the SPM informs the AMF which will remove all or part of the UEs that are served from that slice from the network. As a part of the removal, the AMF will send the reduction message containing information on the reason for the removal to the alternate network selection function on the UE. The removed roaming UEs will then try to register on another VPLMN, based on the analysis by the alternate network selection function (ANSF) of the information available on their USIMs and the new information about the network reduction, e.g. a partial failure. In this way, the load on the VPLMN having the network failure is reduced while the roaming UEs continue to be served by a suitable network slice of an alternative network.

In an embodiment, the access and mobility management function is configured to determine a set or a number of the user equipments using the affected network slice and to reduce services via at least one affected network slice by removing the set or the number of user equipments from the affected network slice. The AMF may determine a set of UEs to be removed, where the size or number is proportional to the reduction in communication or other resources. Effectively, the reduction in services that results from this AMF action may then be proportional to the number of UEs, which proportionality comes from the link to the reduction of resources because of the partial network failure.

In an embodiment, the access and mobility management function (AMF) is configured to update the slicing configuration in the user equipment by using a configuration update procedure, while including the slice reduction message in the configuration update procedure. Advantageously, a configuration update procedure may be enhanced by including the slice reduction message.

In an embodiment, the slice priority management function (SPM) is configured to communicate with a home network of the user equipment to obtain preference data indicative of preferences or priorities for slices to be scaled down or removed; and determine to reduce services via at least one affected network slice in dependence of the obtained preference data. Advantageously, the preferences for said reduction are now based on information in the home network.

In an embodiment, the access and mobility management function (AMF) is configured to include timing information in the slice reduction message, the timing information indicating when scaled-down or de-instantiated slices are expected to be available again, or a minimum waiting time that the user equipment must wait before attempting to register with the initial network. Advantageously, the user equipment may now take an informed decision on how to proceed.

In an embodiment, the access and mobility management function (AMF) is configured to, when sending multiple slice reduction messages to respective user equipments, include different waiting times between the slice reduction messages to avoid the user equipment from registering at the alternative network at the same time. Advantageously, spreading the deregistration of the individual UEs over a certain time period prevents the UEs from all registering at the alternative VPLMN at the same time which otherwise may cause overload.

In an embodiment, the slice priority management function (SPM) is configured to communicate with a home network of the user equipment to inform the home network of said slice reduction to enable the home network to inform, before said slice reduction, the access and mobility management function of said slice reduction via a network initiated deregistration procedure, while including the slice reduction information in the network initiated deregistration procedure.

In an embodiment, the access and mobility management function (AMF) is configured to send a reduction announcement message indicative of the upcoming reduction to enable a user equipment to establish a connection with an alternate network before the slice reduction.

In an embodiment, the alternate network selection function (ANSF) is configured to use timing information in the slice reduction message to determine whether and when to re-register to the network. Advantageously, the ANSF in the UE may use the timing information to timely, and not in vain, re-register to the original network.

In an embodiment, the alternate network selection function (ANSF) is configured to register to an alternative network for transferring at least part of the services via the affected network slice, while remaining on the initial network for network slices that have not been affected.

In an embodiment, the alternate network selection function (ANSF) is configured to send a response to the slice reduction message or a reduction announcement message to inform the access and mobility management function (AMF) that the user equipment will terminate the connection to the affected network slice and will remain connected for network slices that have not been affected.

It will be appreciated by those skilled in the art that two or more of the above-mentioned embodiments, implementations, and/or aspects of the invention may be combined in any way deemed useful. Also, function names such as SPM, AMF or ANSF are descriptive names but do not necessarily imply limitations other than those claimed and/or described.

Modifications and variations of any one of the processor systems, networks and network nodes, methods and/or the computer programs, which correspond to the described modifications and variations of another one of these entities, and vice versa, may be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

Figure 1:
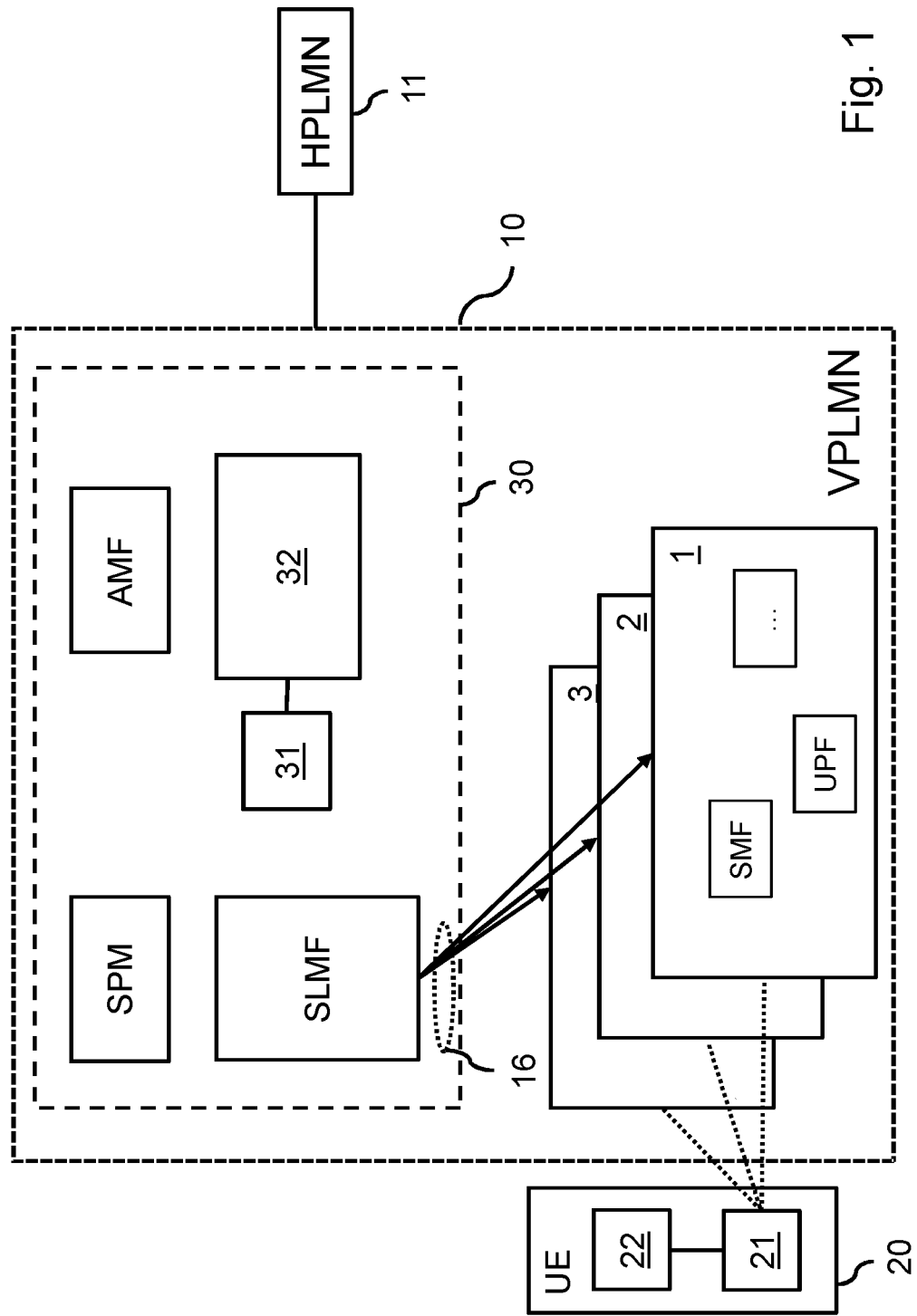
FIG. 1 shows a schematic view of a 3GPP communication network.

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

AMF access and mobility management function
ANSF alternate network selection function
API application programming interface
CSP Communication Service Provider
HPLMN home public land mobile network
NRF network repository function
NSMF network slice management function
NSSMF network slice subnet management function
PCF policy control function
PDU protocol data unit
RAN radio access network
SLMF slice management function
SMF session management function
S-NSSAI single—network slice selection assistance information
SPM slice priority management function
U_APP user application
UDM unified data management function
UE user equipment
UPF user plane function
USIM universal subscriber identity module
VPLMN visited public land mobile network
1-3 network slice
10 visited public land mobile network
11 home public land mobile network
16 data for network slice management by SLMF
20 user equipment
21 communication interface
22 processor system
30 slice control system
31 network interface
32 processor system
300-350 method for providing slice management
301-341 method for providing alternate network selection
400 system representing network node
410 network interface
420 processor (sub)system
430 storage
500 computer readable medium
510 non-transitory data
1000 exemplary data processing system
1002 processor
1004 memory element
1006 system bus
1008 local memory
1010 bulk storage device
1012 input device
1014 output device
1016 network adapter
1018 application

DETAILED DESCRIPTION OF EMBODIMENTS

The following embodiments are described in the context of a telecommunication network adhering to one or more 5G 3GPP standards. However, the concepts described in the following embodiments may equally apply, mutatis mutandis, to any other type of communication network capable of instantiating virtual networks and/or network slices and having slice management functions capable of performing the functions as defined by the wording of the claims.

FIG. 1 shows a schematic view of a 3GPP communication network 10 which is configured to enable instantiation of network slices. By way of example, FIG. 1 shows three network slices 1-3 having been instantiated. The communication network 10 may have a slice management function SLMF, which may include a network slice subnet management function (NSSMF) and a network slice management function (NSMF) for management of the network slices 1-3. In the example, network slice 1 is instantiated to comprise a session management function (SMF) and a user plane function (UPF), and may have further functions (known as such).

Management of the network slices is conceptually represented in FIG. 1 by arrows 16 between the SLMF and the respective network slices 1-3, with such arrows representing data communication for the management of network slices. FIG. 1 further shows a slice control system 30 as indicated by a dashed line, which system has a network interface 31 and a processor system 32 to provide enhanced slice control functions. The slice control system may provide a slice priority management function (SPM), and an access and mobility management function (AMF) for managing the communication to at least one user equipment (UE) via one or more instantiated network slices, as further elucidated below. In practice, the AMF, although shown separate of the slices, may be part of a slice or part of multiple slices. The slice control system may further provide other slice control functions, e.g. (part of) the slice management function (SLMF).

The network is configured to provide services via a network slice 1 to a user equipment (UE) 20. The user equipment has a communication interface 21 and a processor system 22, which is configured to maintain user information (USIM) and to provide an alternate network selection function (ANSF) configured to receive a slice reduction message, as elucidated below.

Network 10 may be a Visited Public Land Mobile Network (VPLMN) that is visited during roaming of the UE. FIG. 1 further shows a further network 11, which may be Home Public Land Mobile Network (HPLMN) being connected to the communication network 10.

Figure 2:
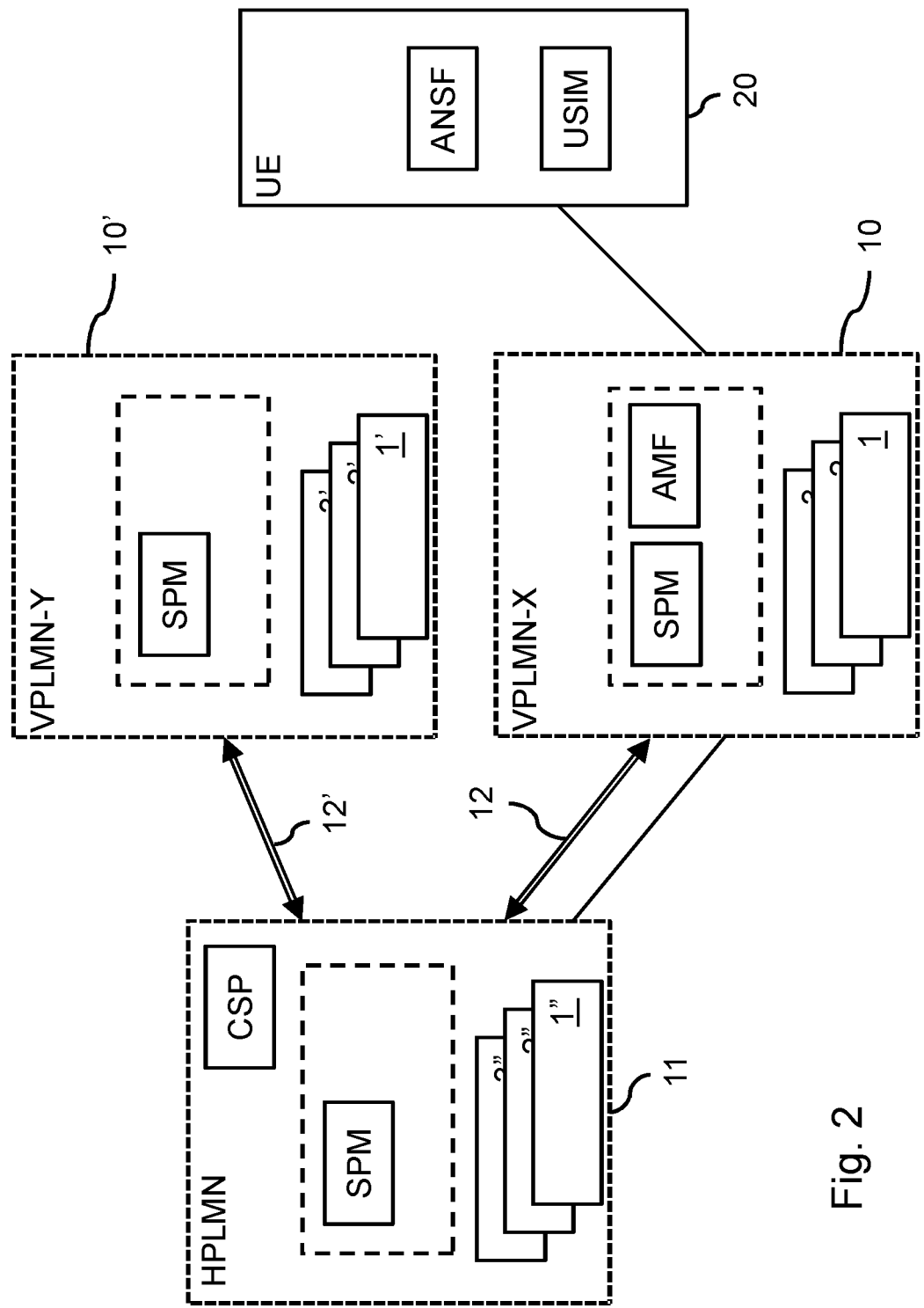
FIG. 2 shows multiple networks and a roaming user equipment.

FIG. 2 shows multiple networks and a roaming user equipment. The networks have a structure as elucidated with FIG. 1, while various functions are shown in FIG. 2. A Home Public Land Mobile Network (HPLMN) 11 has a roaming agreement with various Visited Public Land Mobile Networks (VPLMN-X, VPLMN-Y) 10, 10' as indicated by double arrows 12, 12'. The Figure shows user equipment (UE) 20 during roaming and being in communication with VPLMN-X.

In the VPLMN 10 in the slice management function, the SPM is provided and configured to receive data indicative of a change in the network's ability to maintain the instantiated network slices, and determine to reduce services via at least one affected network slice in dependence of the received data. Subsequently, before said slice reduction, the SPM informs the access and mobility management function (AMF) of said slice reduction.

The AMF is configured to, upon being informed of said slice reduction, send a slice reduction message to the user equipment, the message containing slice reduction information on said slice reduction In the user equipment, there is maintained user information (USIM), the user information regarding user identity and user communication information. Also, there is provided the alternate network selection function (ANSF) configured to receive the slice reduction message. The ANSF, upon receiving the message, selects an alternate network based on the user information and the slice reduction information; and triggers registration on the selected alternate network for transferring at least part of the services of the affected network slice to a network slice of the selected alternate network.

In a practical, exemplary embodiment, the following steps are used (not shown as such in the figures). In step one the SPM detects a partial failure in the network. In step two, the SPM determines that it cannot resolve the consequences of the failure for the slices used by roaming UEs within the network itself. Consequently, the service offered by the VPLMN to the roaming UEs will be affected by the failure. So, based on the data regarding the network failure, the SPM determines the slices that will be scaled down or de-instantiated completely.

In step three, the SPM notifies the Access and Mobility management Function (AMF) that one or more slice(s), identified by their S-NSSAI or an equivalent identifier, have failed or need to be scaled down. The S-NSSAI is used to uniquely identify a Network Slice. This information differs from information indicating that slices are not available due to congestion, which does not incite a movement to a different network.

Figure 3:
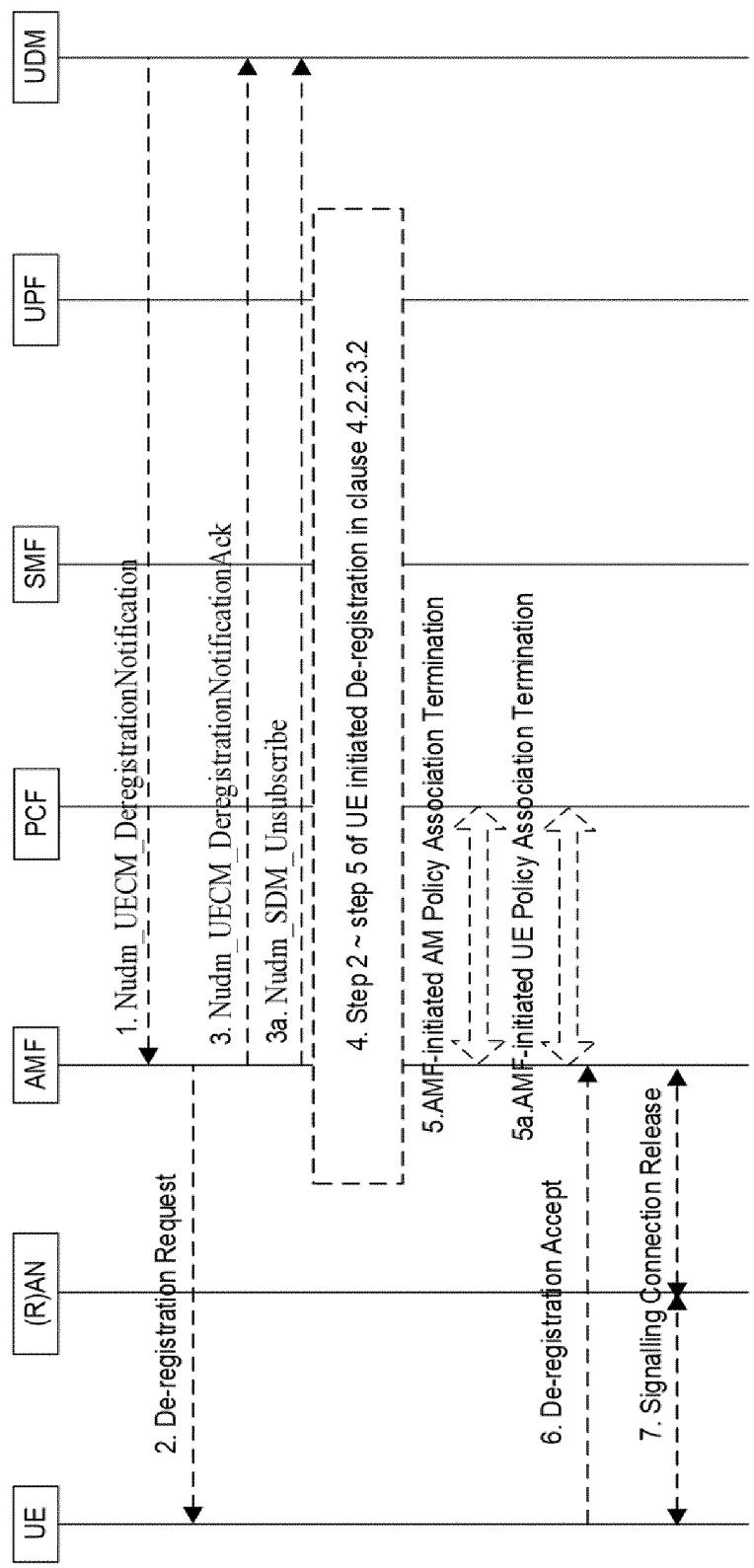
FIG. 3 shows a network initiated deregistration procedure.

FIG. 3 shows a network initiated deregistration procedure. The procedure shown is an example of a Network Initiated Deregistration procedure taken from TS 23.502 [3], clause 4.2.2.3.3, and further described there.

Continuing the above exemplary embodiment, in step four the AMF determines a set of roaming UEs and removes them from the network, for example using the above Network Initiated Deregistration procedure with a new cause code "slice not available due to temporal network failure" sent in step two, listing the affected slices by their S-NS-SAIs. This information is received and stored by the Alternate Network Selection Function (ANSF) on the UE for future use. The Network initiated deregistration procedure used is not started by the UDM in this case, which is one of the options that is described in the standard.

In step five, after the Network Initiated Deregistration procedure, the ANSF on the UE determines an alternative VPLMN to register on. In this determination, the ANSF may combine existing 3GPP procedures for PLMN selection and USIM with the new information from step four. It is noted that the new network may be the same network if the UE determines it is acceptable to (temporarily) not use the affected slices, for example if the applications that the UE wants to use can also be mapped to other slices through a Network Slice Selection Policy.

In step six, the UE does network discovery, using the existing procedures from 3GPP, while in step seven the UE connects to new VPLMN-Y, using the existing procedures from 3GPP.

As illustrated above, the enhanced system introduces new functionalities in a 3GPP network. In particular, in the SPM, for informing the AMF on the network slices that will be scaled down or removed. And further in the AMF, for receiving the information from the SPM and determining the roaming UEs that use the network slices and are affected by their scaling down or removal. And also in the UE, where functions are contained in the new Alternate Network Selection Function, which store the information on the affected slices and use this information in combination with information from the USIM and the NSSP to determine network to register on next.

Figure 4:
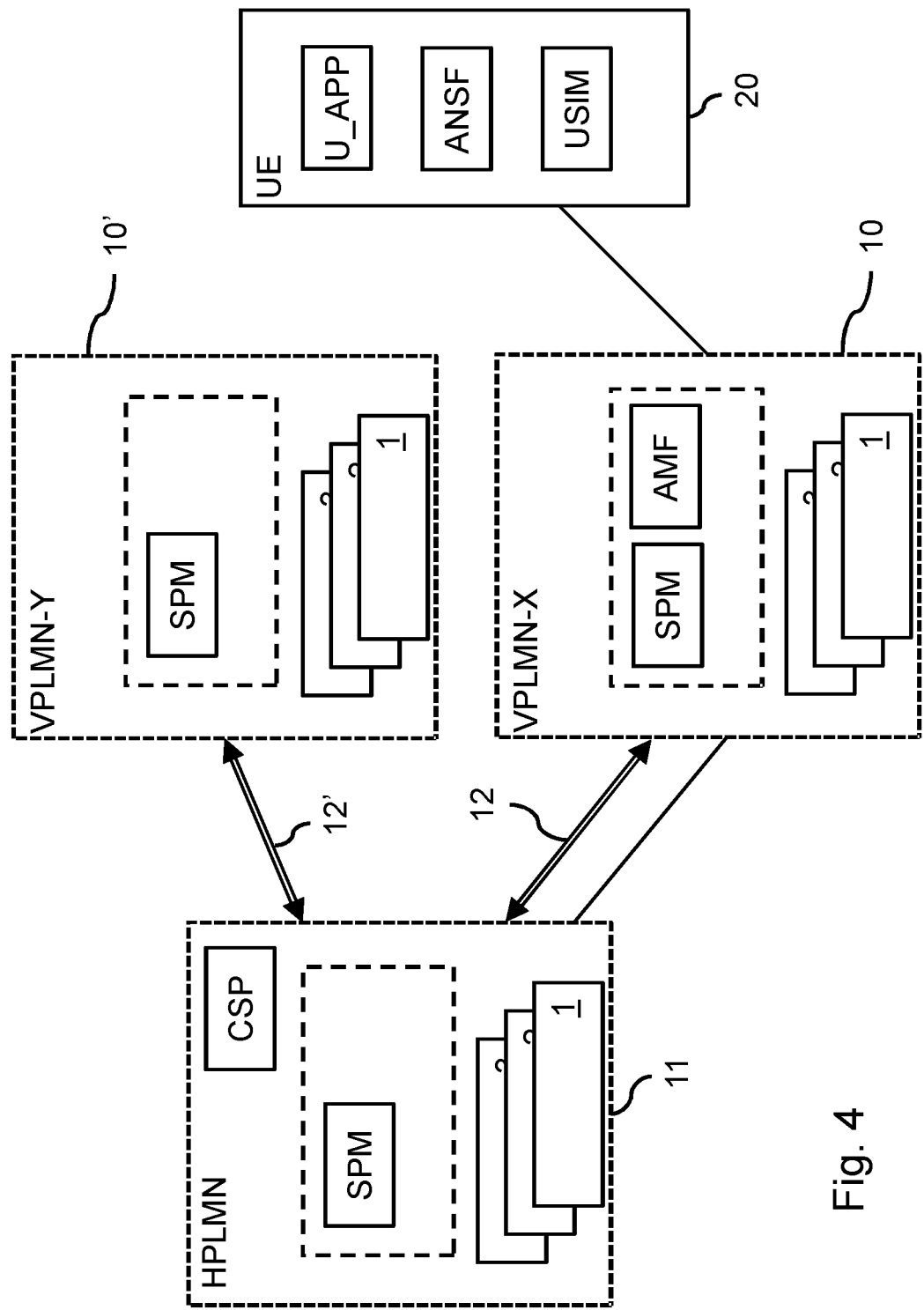
FIG. 4 shows multiple networks and a roaming user equipment having a user application.

FIG. 4 shows multiple networks and a roaming user equipment having a user application. The application may provide an indication to the end user of the expected service interruption caused by the re-registration The user equipment 20 executes the user application that may be a user-facing application or at least has a user interface that informs the user of UE of the (potential, imminent) occurrence of a service interruption, when the ANSF on the UE receives a slice reduction message, e.g. a de-registration message with a cause value "slice not available due to network failure". The ANSF may send a message to the user application to inform the end user. For example, a message may be sent to the user application around the same time as the UE is instructed to start network discovery in step six above. The user may also be asked for his preferences, e.g. for temporarily interrupting the communication, or incurring additional costs.

In an embodiment, the AMF may be configured to update the slicing configuration in the user equipment by using a configuration update procedure, while including the slice reduction message in the configuration update procedure. So, the UE slicing configuration may be updated upon said slice reduction. Instead of deregistering UEs which completely removes UEs from the network, the AMF may also update the slicing configuration in the UE, e.g. by using the UE Configuration Update procedure as specified in TS 23.502 [3] clause 4.2.4.2 and include the rejected S-NSSAI together with a new cause code "slice not available due to temporal network failure" in step one above (UE Configuration Update Command). This triggers the UEs ANSF to reselect another network depending on whether the importance of the failed slice is high. The embodiment empowers the UE to take a decision whether the failed slice was imperative for its use.

In practice, a Network Slice Selection Function may be a bridge between the management plane and the control plane. For example, in step three above the SPM may notify the NSSF (Network Slice Selection Function, described in 3GPP TS 23.501 [1]) that one or more S-NSSAIs have failed, which in turn notifies the AMF. This may preserve the current division of functionalities as the SPM is a management plane function whereas the AMF is a control plane network function. The NSSF may function as a bridge (or intermediary) between the two planes with regards to network slicing. In an alternative embodiment, the NSSF may implement the SPM functionality.

In an embodiment, the SPM may be configured to communicate with a home network of the user equipment to obtain preference data indicative of preferences or priorities for slices to be scaled down or removed, and determine to reduce services via at least one affected network slice in dependence of the obtained preference data. For example, the SPM in the VPLMN may contact the HPLMN to obtain further information on the preferences or priorities for slices to be scaled down or removed. This can be useful as the UEs serviced by different slices may have different values or priorities from the perspective of the HPLMN operator. So, additional information on slice preferences from CSPs linked to the home network is obtained before scaling down or de-instantiation of slices in the visited network.

Additional to step three above, the SPM in the VPLMN contacts the SPM in the HPLMN to obtain the preferences from the HPLMN. Apart from obtaining preferences, the SPM in the HPLMN may communicate with the Communication Service Provider (CSP) to explore rearrangements of priorities or slice sizes, as described in the earlier application PCT/EP2019/077560. There may be multiple CSPs, and the SPM in the HPLMN determines the preferred slices to be scaled down or removed based on the combined information from the CSPs. The information on these slices is sent to the SPM in the VPLMN and used by that SPM to make the final selection. The process then continues at step 3 above.

Figure 5:
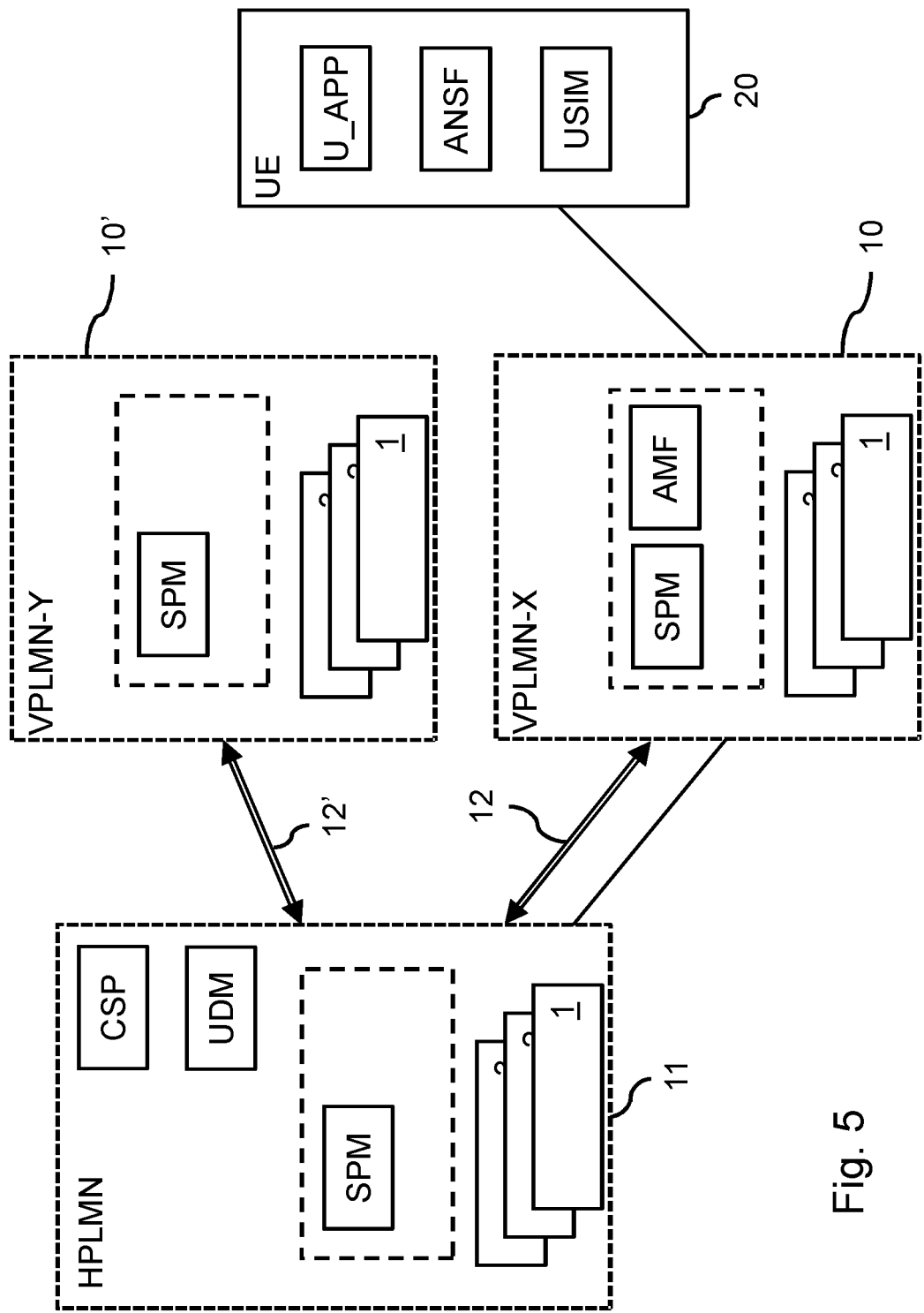
FIG. 5 shows using subscription information.

FIG. 5 shows using subscription information. In the embodiment the SPM in the home network may use subscription information, which it gets through Unified Data Management function (UDM) in the home network, to determine the preferences for slices to be scaled down. The SPM in the visited network obtains these preferences, although not the subscription information itself, and uses the preferences for the rest of the procedure. Indirectly the SPM in the VPLMN uses subscription information to obtain further information on the preferences or priorities for slices to be scaled down or removed. This may be useful as the UEs serviced by different slices may have different values or priorities from the perspective of the HPLMN operator. According to 3GPP practice, the UDM contains the subscription information for each of the HPLMN's UEs, including information on slices and roaming, with the option to include priorities. The information on slices or groups of users is obtained from the UDM in the HPLMN by the SPM in the HPLMN, which uses the UDM data to determine its preferences for slices to be scaled down or de-instantiated. The other steps are the same as in the previous embodiment.

In the embodiment, a home system is configured to provide a home slice management function for a home network for wireless communication to UE. The home system comprises a network interface configured to communicate with the home network and the slice management function as described above for the VPLMN and a processor system which provides a home slice priority management function (HSPM). The HSPM is configured to receive data indicative of said slice reduction from the slice management function; and use subscription information of the user equipment to generate preference data indicative of preferences or priorities for slices to be scaled down or removed. The HSPM transmits the obtained preference data to the slice management function in the VPLMN to reduce services via at least one affected network slice in dependence of the obtained preference data.

In another embodiment, steering of timing of re-registration is controlled by the AMF. In step four above, the AMF sends timing information with the reduction message or the removal message to the UE. The timing information indicates when the scaled-down or de-instantiated slices are expected to be available again. The ANSF function in the UE uses this timing information to determine whether and when to reregister to the initial VPLMN later. So, the alternate network selection function (ANSF) is configured to use the timing information in the slice reduction message to determine whether and when to re-register to the network.

In a further embodiment, in step four above, the AMF sends timing information in the removal message to the UE that indicates a minimum waiting time that the ANSF or UE must wait before attempting to register with the initial VPLMN. The ANSF function in the UE uses this timing information to determine whether and when to reregister to the initial VPLMN later.

In another embodiment, the timing of slice reduction messages by AMF to respective UE is spread over a period of time. In the embodiment, when the AMF is to deregister/remove a large set of UEs in in step four above, it spreads the deregistration of the individual UEs over a certain time period to prevent the UEs from all registering at the alternative VPLMN at the same time and overloading it.

In another embodiment, when the capacity of a slice is reduced, e.g. measured in bandwidth, processing or storage resources, the SPM informs in the AMF in step three above of the size of the reduction and the AMF determines the number of UEs to be removed, for example by retaining a number proportional to the remaining size of the slice.

In another embodiment, the SPM in the VPLMN informs the SPM in the HPLMN about the network failure. The SPM in the HPLMN contacts the UDM similar to initial steps in the embodiment discussed with FIG. 5, but after that, the UDM contacts the AMF in the VPLMN directly to execute the 3GPP deregistration procedure, with the new cause code "slice not available due to temporal network failure". For example, a purge UE procedure by AMF in VPLMN triggered from UDM in HPLMN may have the following steps.

a. The SPM detects a failure in the network.
b. The SPM determines that it cannot resolve the consequences of the failure for the slices used by roaming UEs within the VPLMN. Consequently, the service offered by the VPLMN to the roaming UEs will be affected by the failure.
c. The SPM in the VPLMN informs the SPM in the HPLMN of the slices that have failed or need to be scaled down.
d. The SPM in the HPLMN contacts the UDM in the HPLMN with the information which slice(s) that have failed or that will be scaled down by sending their S-NSSAIs.
e. The UDM initiates a network initiated deregistration procedure, e.g. as specified in 3GPP TS 23.502 [3] clause 4.2.2.3.3 and uses the removal reason cause "slice not available due to temporal network failure".
f. The AMF then maps this removal reason to the cause sent to the UE in a deregistration request.
g. The ANSF on the UE determines an alternative VPLMN to register on. In this determination, the ANSF combines existing 3GPP procedures for PLMN selection and USIM with the new information received in step f.
h. UE does network discovery, using the existing procedures from 3GPP.
i. UE connects to new VPLMN Y, using the existing procedures from 3GPP.

In an alternative embodiment, the UDM rejects initial registration requests from new UEs for the specific S-NSSAI with the same rejection reason. In a legacy steering of roaming solution, UEs registration requests are rejected from certain visited PLMNs. The difference is that in this case, only the S-NSSAI(s) which was reported by the SPM as failed will be rejected and the UEs ANSF can then decide whether to attempt another VPLMN or stay in the same. Optionally, information on which S-NSSAI to be used if the ANSF in the UE decides to stay in the same VPLMN can be sent to the UE together with the rejection message as a Suggested S-NSSAI. The procedure to do this is the same as in the previous embodiment until and including step four. After this, all registration messages received from roaming UEs that include the failed S-NSSAI are rejected with reason "slice not available due to temporal network failure" which is then mapped by the visited AMF to cause code "slice not available due to temporal network failure" sent to the UE. This triggers the ANSF in the same way as described earlier.

Figure 6:
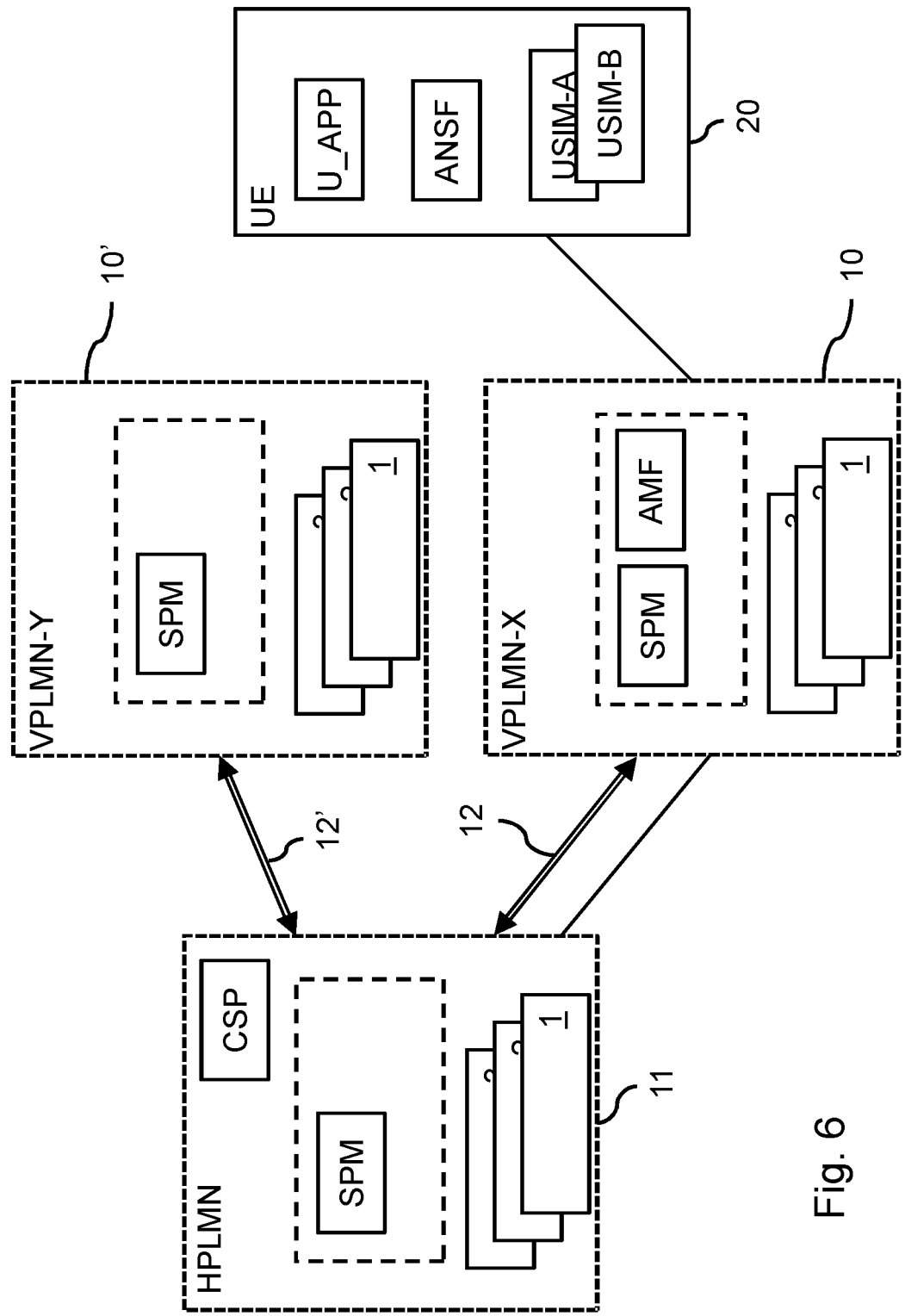
FIG. 6 shows a communication system enabling make before break with multi SIM UE.

FIG. 6 shows a communication system enabling make before break with multi SIM UE. In the embodiment, the UE has at least one further USIM, shown in the Figure as USIM-A and USIM-B. The alternate network selection function (ANSF) is configured to register to an alternative network for transferring at least part of the services via the affected network slice, while remaining on the network for network slices that have not been affected. So the embodiment is relevant for UEs with multiple USIMs or SIMs, and an attempt is made to establish a connection with a new VPLMN before the connection with the initial VPLMN is removed, so called "make before break".

For example, the following steps may be executed. Steps one to three are the same is in the embodiment discussed with FIG. 2. Step four is also the same, except that rather than sending an actual deregistration message as in the basic embodiment, the AMF sends an announcement of deregistration message, potentially including information on the timing of the actual deregistration message to be sent later. In step five the ANSF on the UE determines an alternative VPLMN to register on. In this determination, the ANSF combines existing 3GPP procedures for PLMN selection and USIM with the new information from step four. The ANSF makes this determination using USIM B, which is separate from USIM A used for the initial connection. Then in step six, the UE does network discovery, using the existing procedures from 3GPP. In step seven, the UE connects to new VPLMN Y based on USIM B, using the existing procedures from 3GPP and in step eight the AMF sends the deregistration message, causing the initial connection based on USIM A to be removed.

In another embodiment, the UE having two USIM as shown in FIG. 6 connects to an alternative VPLMN using USIM B for the slices that have been removed or scaled down in the initial VPLMN, while it remains on the initial VPLMN using USIM A for slices that have not been affected. In this embodiment, the UE may send a response to the AMFs announcement of deregistration (step 4 above) to inform the AMF that it will terminate its connections to the affected slices and wants to remain connected for the other slices. The AMF may then decide not to send the actual deregistration message (step eight above).

So, the alternate network selection function (ANSF) may be configured to register to an alternative network for transferring at least part of the services via the affected network slice, while remaining on the network for network slices that have not been affected.

In another embodiment, the mechanisms described above are used to transfer UEs from the HPLMN to a VPLMN, instead of from one VPLMN to another VPLMN. This can be useful if the coverage areas of the HPLMN and the VPLMN overlap, as is the case in national roaming scenarios. In above the embodiments, this would imply that the actions and exchanges that take place in VPLMN X are carried out in the HPLMN.

Figure 7B:
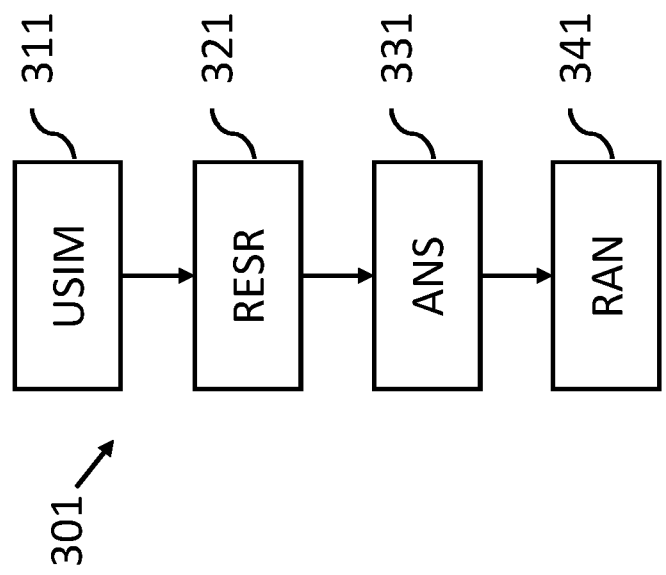
FIG. 7b shows a computer implemented method for alternate network selection in user equipment.
Figure 7A:
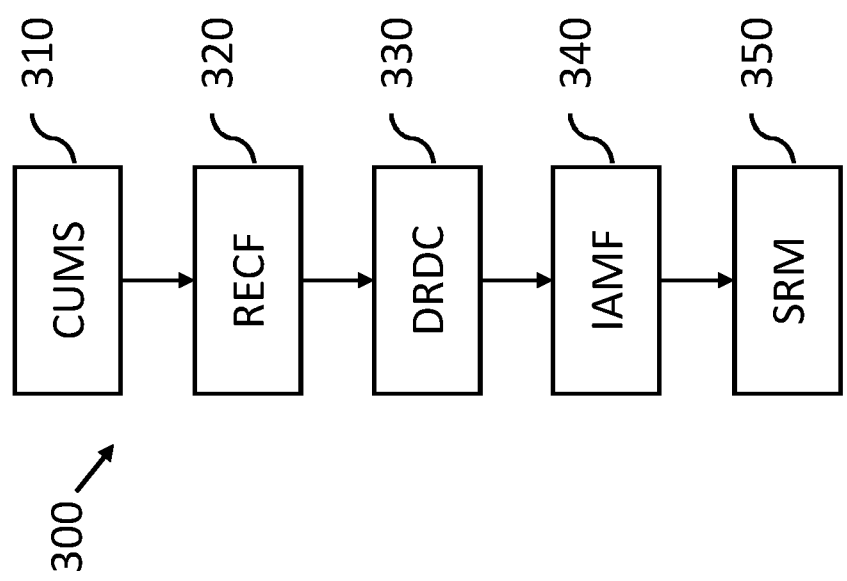
FIG. 7a shows a computer implemented method for providing slice management.

FIG. 7a shows a computer implemented method for providing slice control. The slice control is for a network for wireless communication to user equipment (UE), while the network is configured to enable instantiation of network slices which represent virtual networks. The method involves the following stages. In a first stage CUMS 310 the communication to at least one user equipment (UE) is managed via one or more instantiated network slices, which stage effectively continues until detection of a partial network failure, while further continuing for unaffected slices. Next, in a step RECF 320, there is received data indicative of a change in the network's ability to maintain the instantiated network slices, e.g. a partial network failure. Next, in stage DRDC 330, it is determined to reduce services via at least one affected network slice in dependence of the received data. Next, before said slice reduction, in step IAMF 340, an access and mobility management function is informed of said slice reduction. Finally in step SRM 350, upon the access and mobility management function being informed of said slice reduction, a slice reduction message is sent to the user equipment, the message containing slice reduction information on said slice reduction.

FIG. 7b shows a computer implemented method for alternate network selection in user equipment (UE) for cooperating with the control system described above in a network for wireless communication. The method involves the following stages. In a first stage USIM 311, which continues as long as the UE is active, user information is maintained, the user information regarding user identity and user communication information. In a next stage RESR 321, alternate network selection is started upon receiving a slice reduction message, which message is described above. Next, in a step ANS 331, an alternate network is selected based on the user information and the slice reduction information. Then, in a step RAN 341, the UE is registered on the selected alternate network for transferring at least part of the services of the affected network slice to a network slice of the selected alternate network.

Figure 9:
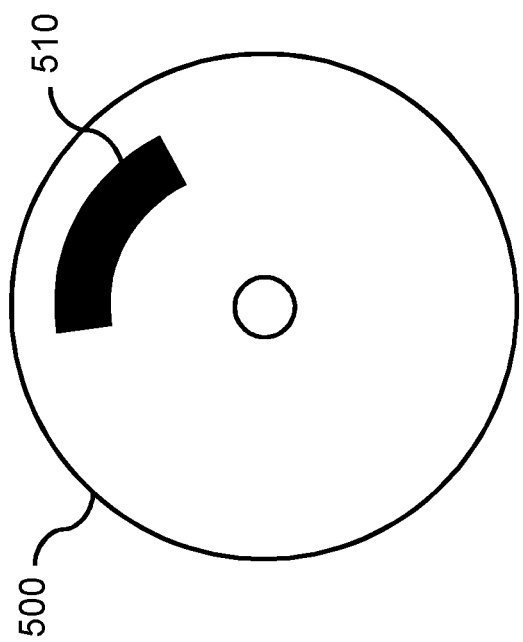
FIG. 9 shows a computer readable medium comprising data.
Figure 8:
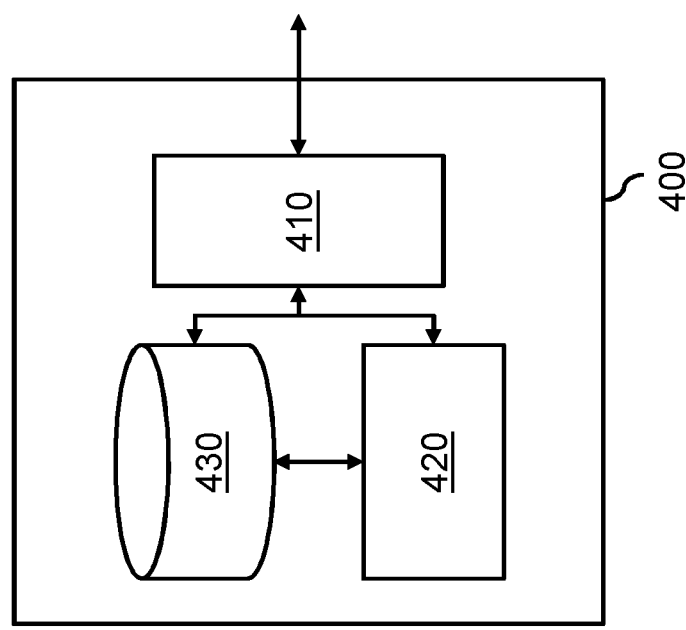
FIG. 8 shows a system which may represent a network node implementing a slice management function.

FIG. 8 shows a system which may represent a network node implementing slice control as described above. The system 400 may comprise a network interface 410 for communicating with (other) network nodes in the network. The network interface 410 may take any suitable form, including but not limited to a wired network interface based on Ethernet or optical fiber or a wireless network interface. FIG. 9 further shows the system 400 comprising a storage 430, such as a hard disk, a solid-state drive, or an array thereof, which may be used by the system 400 for storing data.

The system 400 may further comprise a processor subsystem 420, which may also simply be referred to as a 'processor system', and which may be configured, e.g., by hardware design or software, to perform the operations described in this specification in as far as pertaining to the SPM and/or the AMF. For example, the processor 420 may be embodied by a single Central Processing Unit (CPU), but also by a combination or system of such CPUs and/or other types of processing units. In general, the system 400 may be embodied by a (single) device or apparatus, e.g., a network server. However, the system 400 may also be embodied by a distributed system of such devices or apparatuses, e.g., a distributed system of network servers.

In general, the SPM and/or the AMF may be implemented at least in part by a device or apparatus. The device or apparatus may comprise one or more (micro)processors which execute appropriate software. Software implementing the functionality of the function(s) may have been downloaded and/or stored in a corresponding memory or memories, e.g., in volatile memory such as RAM or in non-volatile memory such as Flash. Alternatively, the function(s) may be implemented in the device or apparatus in the form of programmable logic, e.g., as a Field-Programmable Gate Array (FPGA). In general, each function may be implemented as a circuit.

It is noted that any of the methods described in this specification, for example in any of the claims, may be implemented on a computer as a computer implemented method, as dedicated hardware, or as a combination of both. Instructions for the computer, e.g., executable code, may be stored on a computer readable medium 500 as for example shown in FIG. 9, e.g., in the form of a series 510 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 9 shows by way of example an optical storage device 500.

In an alternative embodiment of the computer readable medium 500 of FIG. 9, the computer readable medium 500 may comprise transitory or non-transitory data 510 representing a data structure of the slice object described in this specification.

Figure 10:
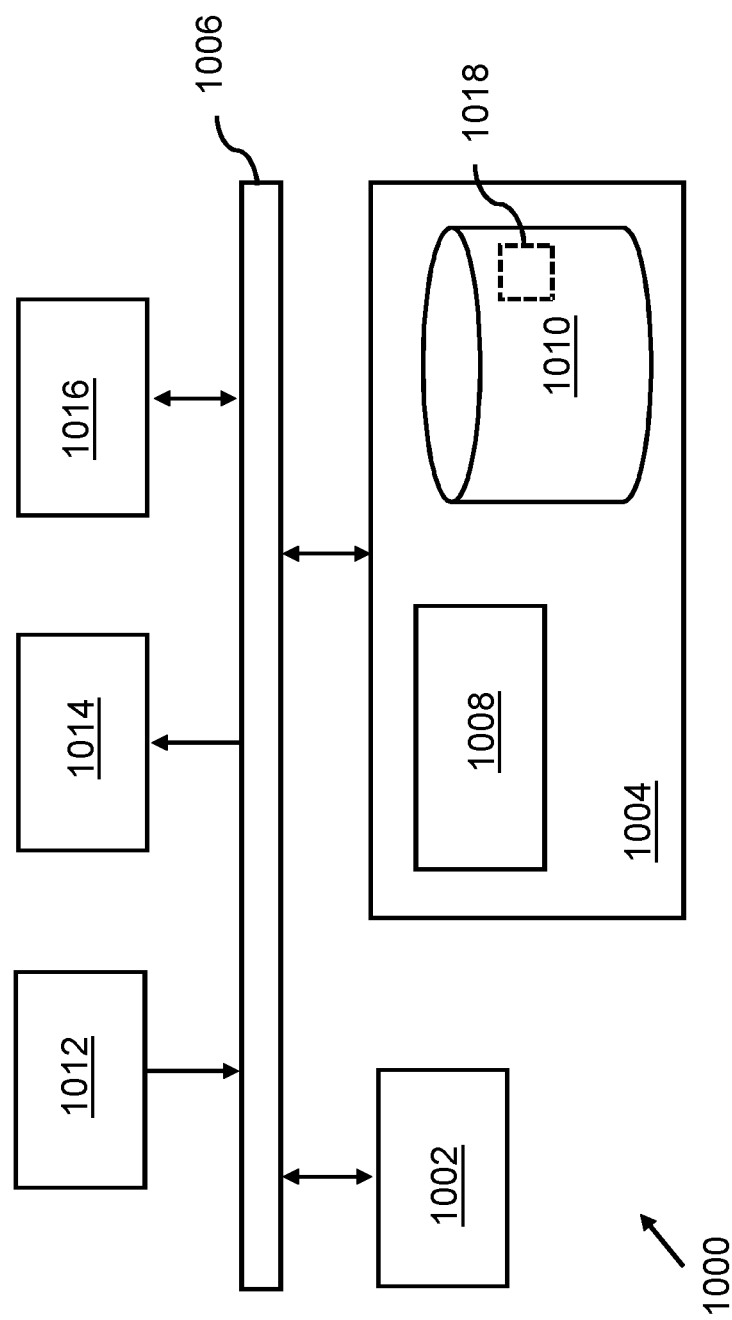
FIG. 10 shows an exemplary data processing system.

FIG. 10 is a block diagram illustrating an exemplary data processing system that may be used in the embodiments described in this specification. Such data processing systems include data processing entities described in this specification, including but not limited to data processing entities implementing functions such as but not limited to the SPM, the AMF, etc. The data processing system 1000 may include at least one processor 1002 coupled to memory elements 1004 through a system bus 1006. As such, the data processing system may store program code within memory elements 1004. Further, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

Memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The processing system 1000 may also include one or more cache memories (not shown) that provide temporary storage of at least some program code in order to reduce the number of times program code must be retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, a game controller, a Bluetooth controller, a VR controller, and a gesture-based input device, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 10, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

In one aspect, for example, data processing system 1000 may implement the SPM. In that case, application 1018 may represent an application that, when executed, configures data processing system 1000 to perform the functions described herein with reference to the SPM. In another aspect, data processing system 1000 may implement the AMF. In that case, application 1018 may represent an application that, when executed, configures data processing system 1000 to perform the functions described herein with reference to the AMF.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A control system for a visited public land mobile network (VPLM) for wireless communication to roaming user equipment, wherein the VPLM network is configured to enable instantiation of network slices which represent virtual networks;
   wherein the control system comprises:
   a network interface configured to communicate with the VPLM network; and
   a processor system configured to provide:
   an access and mobility management function (AMF) for managing the communication to at least one roaming user equipment (UE) via one or more instantiated network slices, and
   a slice priority management function (SPM) configured to:
   receive data indicative of a change in the VPLM network's ability to maintain the instantiated network slices; and
   determine to reduce services via at least one affected network slice in dependence of the received data; and
   before said slice reduction, inform the access and mobility management function of said slice reduction;
   the access and mobility management function (AMF) configured to:
   upon being informed of said slice reduction, send a slice reduction message to the at least one roaming user equipment, the message containing slice reduction information on the cause of said slice reduction to enable the user equipment to establish a connection with an alternate VPLM network before the slice reduction.

2. The system according to claim 1, wherein the access and mobility management function (AMF) is configured to determine a set or a number of roaming user equipments (UEs) using the affected network slice and to reduce services via at least one affected network slice by removing the set or the number of roaming user equipments (UEs) from the affected network slice.

3. The system according to claim 1, wherein the access and mobility management function (AMF) is configured to update the slicing configuration in the roaming user equipment by using a configuration update procedure, while including the slice reduction message in the configuration update procedure.

4. The system according to claim 1, wherein the slice priority management function (SPM) is configured to
   communicate with a home network of the roaming user equipment to obtain preference data indicative of preferences or priorities for slices to be scaled down or removed; and
   determine to reduce services via at least one affected network slice in dependence of the obtained preference data.

5. The system according to claim 1, wherein the access and mobility management function (AMF) is configured to include timing information in the slice reduction message, the timing information indicating when scaled-down or de-instantiated slices are expected to be available again, or a minimum waiting time that the roaming user equipment must wait before attempting to register with the initial network.

6. The system according to claim 1, wherein the access and mobility management function (AMF) is configured to, when sending multiple slice reduction messages to respective roaming user equipments (UEs), include different waiting times between the slice reduction messages to avoid the roaming user equipment from registering at the alternative network at the same time.

7. The system according to claim 1, wherein the slice priority management function (SPM) is configured to communicate with a home network of the user equipment to inform the home network of said slice reduction to enable the home network to inform, before said slice reduction, the access and mobility management function of said slice reduction via a network initiated deregistration procedure, while including the slice reduction information in the network initiated deregistration procedure.

8. The system according to claim 1, wherein the access and mobility management function (AMF) is configured to send a reduction announcement message indicative of the upcoming reduction to enable a user equipment to establish a connection with an alternate network before the slice reduction.

9. Home system for a home network for wireless communication to user equipment (UE), wherein the home network is configured to enable instantiation of network slices which represent virtual networks;
   wherein the home system comprises:
   a network interface configured to communicate with the home network and a control system in the VPLM network according to claim 1; and
   a processor system configured to provide:
   a home slice priority management function configured to:
   receive data indicative of said slice reduction from the control system of the VPLM network; and
   use subscription information of the roaming user equipment to generate preference data indicative of preferences or priorities for slices to be scaled down or removed; and
   transmit the obtained preference data to the control system of the VPLM network to reduce services via at least one affected network slice in dependence of the obtained preference data.

10. User equipment for cooperating with the control system according to claim 1, wherein the user equipment comprises:

a communication interface for wireless communication to at least one network via one or more network slices; and a processor system configured to:

maintain user information (USIM), the user information regarding user identity and user communication information; and provide an alternate network selection function (ANSF) configured to:

receive the slice reduction message; and select an alternate network based on the user information and the slice reduction information; and trigger registration on the selected alternate network for transferring at least part of the services of the affected network slice to a network slice of the selected alternate network.

11. User equipment according to claim 10, wherein the alternate network selection function (ANSF) is configured to use timing information in the slice reduction message to determine whether and when to re-register to the network.

12. User equipment according to claim 10, wherein the alternate network selection function (ANSF) is configured to register to an alternative network for transferring at least part of the services via the affected network slice, while remaining on the network for network slices that have not been affected.

13. User equipment according to claim 10, wherein the alternate network selection function (ANSF) is configured to send a response to the slice reduction message or a reduction announcement message to inform the access and mobility management function (AMF) that the user equipment will terminate the connection to the affected network slice and will remain connected for network slices that have not been affected.

14. A computer implemented method for a VPLM network for wireless communication to roaming user equipment (UE), wherein the network is configured to enable instantiation of network slices which represent virtual networks;

wherein the method comprises:

managing the communication to at least one roaming user equipment (UE) via one or more instantiated network slices, and receiving data indicative of a change in the network's ability to maintain the instantiated network slices; and determining to reduce services via at least one affected network slice in dependence of the received data; and before said slice reduction, informing an access and mobility management function of said slice reduction; and upon the access and mobility management function being informed of said slice reduction, sending a slice reduction message to the roaming user equipment, the message containing slice reduction information on the cause of said slice reduction to enable the user equipment to establish a connection with an alternate VPLM network before the slice reduction.

15. A computer implemented method for providing alternate network selection in user equipment (UE) for cooperating with the system according to claim 1, wherein the method comprises:

maintaining user information (USIM), the user information regarding user identity and user communication information; and receiving the slice reduction message; and selecting an alternate network based on the user information and the slice reduction information; and registering on the selected alternate network for transferring at least part of the services of the affected network slice to a network slice of the selected alternate network.

16. A computer-readable medium comprising non-transitory data representing a computer program, the computer program comprising instructions for causing a processor system to perform the method according to claim 14.

* * * * *